(12) United States Patent
Audenaert et al.

(10) Patent No.: US 7,153,585 B2
(45) Date of Patent: Dec. 26, 2006

(54) SELF-ADHERING POWDER PAINT BASED ON POLYAMIDE AND SILANE FOR METAL COATING

(75) Inventors: Marc Audenaert, Bernay (FR); Denis Huze, Fontaine sous Jouy (FR); Emmanuel Rastelletti, Venissieux (FR)

(73) Assignee: Arkema France, Puteaux (FR)

( * ) Notice: Subject to any disclaimer, the term of this patent is extended or adjusted under 35 U.S.C. 154(b) by 40 days.

(21) Appl. No.: 10/498,242

(22) PCT Filed: Dec. 13, 2002

(86) PCT No.: PCT/FR02/04355

§ 371 (c)(1),
(2), (4) Date: Nov. 22, 2004

(87) PCT Pub. No.: WO03/054074

PCT Pub. Date: Jul. 3, 2003

(65) Prior Publication Data

US 2005/0064102 A1    Mar. 24, 2005

(30) Foreign Application Priority Data

Dec. 14, 2001    (FR)    ................................... 01 16216

(51) Int. Cl.
  *B05D 1/04*     (2006.01)
  *B05D 1/22*     (2006.01)
  *B32B 15/04*    (2006.01)
  *B32B 15/08*    (2006.01)
  *H05C 1/00*     (2006.01)

(52) U.S. Cl. ...................... 428/458; 427/458; 427/459; 427/461; 427/472; 427/473; 427/474; 427/475; 427/485; 427/486; 428/457; 524/188

(58) Field of Classification Search ................ 524/188; 427/458, 459, 461, 472, 473, 474, 475, 485, 427/486; 428/457, 458
See application file for complete search history.

(56) References Cited

U.S. PATENT DOCUMENTS

| 4,180,442 A | * | 12/1979 | Byrd ........................... 205/50 |
| 5,409,999 A | | 4/1995 | Merval et al. |
| 6,011,100 A | | 1/2000 | Douals et al. |
| 6,027,814 A | | 2/2000 | Julien et al. |

FOREIGN PATENT DOCUMENTS

| EP | 0969053 A1 | 1/2000 |
| GB | 1478484 | 8/1973 |
| GB | 1508587 | 3/1975 |

* cited by examiner

*Primary Examiner*—Patrick D. Niland
(74) *Attorney, Agent, or Firm*—Thomas F. Roland

(57) ABSTRACT

The invention concerns to the use of a powder comprising 99.95 to 95% of at least one polyamide and 0.05 to 5% of at least one silane for coating metals. This powder may be prepared by simple dry blending of the constituents. The silane can also be added to the molten polyamide in a mixing device and the resulting product reduced to powder. The addition of silane makes it possible to significantly improve electrostatic application by preventing a substantial portion of the powder from falling off during the electrostatic discharge which follows application, while providing lasting adhesion between the coating and metal. Advantageously, the silane is chosen from aminopropyltriethoxysilane and aminopropyltrimethoxysilane. The invention also concerns a method of coating an object with a film resulting from melting a thin layer of the powder.

10 Claims, No Drawings

SELF-ADHERING POWDER PAINT BASED ON POLYAMIDE AND SILANE FOR METAL COATING

This application claims benefit, under U.S.C. §119 or §365 of French Application Number 01/16216, filed Dec. 14, 2001; and PCT/FR02/04355 filed Dec. 13, 2002."

FIELD OF THE INVENTION

The present invention relates to the use of a polyamide and silane-based self-adhesive powder paint for covering metals. The powder paint is useful for covering objects. It is useful in methods of covering an object with a film resulting from the melting of a thin layer of powder deposited beforehand on the object.

At the present time, there are several industrial-scale methods of covering an object.

The first method is electrostatic powder coating; this consists in charging the powder with static electricity and in bringing it into contact with the object to be covered, which is connected to zero potential. For example, the powder is injected into an electrostatic gun which will charge the said powder by the corona effect, by triboelectrification or by a combination of the two. The powder thus charged is sprayed onto the object to be covered, which is connected to zero potential. According to another form of electrostatic powder coating, the object connected to zero potential is dipped into a fluidized bed of charged powder. Within the fluidized bed is a powder with which it is desired to cover the object. This powder is in the form of small solid particles, for example having a size of between 0.01 and 1 mm, of any shape, which are in a state of fluidization within the bed in the presence of air or any other gas. In the fluidized bed are electrodes for charging the powder by the corona effect or a device for charging it by the triboeletric effect. The object covered with powder is then placed in an oven at a temperature sufficient to provide a coating by the film-forming melting of the powder. For example, in the case of a nylon-11 powder, it is sufficient to heat to 220° C.

The second method consists in preheating the object to be covered to a temperature above the melting point of the powder. Once the object is hot, it is immediately immersed in a fluidized bed of the powder, the powder melts on contact with the hot object and a film is formed. A solid covering is thus provided.

The powder paint of the present invention is useful in both methods.

BACKGROUND OF THE INVENTION

The invention relates to the field of high-performance polyamide coatings providing corrosion protection of metals, and more particularly to powder paints applied by an electrostatic method or by an immersion method. In general, polyamide powder paints undergo a more rapid electrostatic discharge than epoxy powder paints when they are in contact with the metal to be coated. This has the effect of causing detachment of some of the powder deposited electrostatically on the metal when the metal part to be coated is subjected to a shock. In addition, as soon as the powder-covered metal starts to be heated, a relaxation of the charges occurs and, depending on the nature of the object to be covered and its geometry, some of the powder may become detached before it has melted and formed the film. Moreover, in general the adhesion of polyamide coatings rapidly decreases when they are exposed to a salt fog atmosphere.

In Patent EP 969 053, the polyamide powder is modified by blending it with polyolefin waxes having a melting point of about 110 to 120° C. Thus, the powders deposited electrostatically on a metal surface become detached less easily.

The prior art has already mentioned in the following patents modified polyamide powders, but the purpose of these compositions is essentially to dispense with primer.

Patent U.S. Pat. No. 5,409,999 describes polyamide powders modified by epoxy sulphonamide resins. These resins are melt-blended with the polyamide, granulated and then ground in order to obtain a powder. This powder is then applied to an object, using an electrostatic method or using a dipping method, and is then melted in order to make a film. In the above prior art, it is explained that this powder has the advantage of avoiding the use of a primer and therefore it is possible to apply it directly to an object.

Patent U.S. Pat. No. 6,027,814 describes a technique similar to the previous one, but with a polyamide powder modified either by EVOH copolymers (ethylene/vinyl alcohol copolymers) or by ethylene/alkyl (meth)acrylate/maleic anhydride copolymers.

Patent U.S. Pat. No. 6,011,100 describes a technique similar to that of Patent U.S. Pat. No. 5,409,999 mentioned above, but with a powder modified by calcium carbonate.

It has now been found that by modifying polyamide powders by silanes, a polyamide powder paint is obtained which can be applied without an adhesion primer, considerably reducing (in the electrostatic method) the amount of powder liable to become detached from the metal when an impact is applied to the metal part.

Another advantage of this powder is that the adhesion remains constant for 2000 hours of exposure to salt fog.

The prior art has already described treatments of powders with silanes, but this was not with polyamide powders. Thus, Patent GB 1 508 587 describes the electrostatic deposition of charged glass or ceramic powders in order to make coatings on objects. These powders are firstly treated by a dihalosilane or trihalosilane in the gas phase and then the treated powder is subsequently brought into contact with steam. The dihalosilane or trihalosilane is dichlorodimethylsilane or trichloromethylsilane. It is stated on page 3, lines 54–61 that this treatment with dihalosilane or trihalosilane has the result of giving the particles thus treated a surface resistivity comparable to that of nylon (that is to say of polyamide). This therefore has nothing to do with the present invention, since its purpose is to modify polyamides.

SUMMARY OF THE INVENTION

The present invention relates to the use of a powder comprising 99.95 to 95% of at least one polyamide and 0.05 to 5% of at least one silane for covering metals.

This powder may be prepared by simple dry blending of the constituents.

It is also possible to add the silane to the polyamide in the melt in a mixing device and to reduce the product obtained into powder form.

The addition of a silane makes it possible to appreciably improve electrostatic application by preventing a substantial portion of the powder from falling off during the electrostatic discharge which follows application, while providing lasting adhesion between the coating and metal. A better adhesion is also provided when using the immersion method.

The present invention also relates to a method of covering an object with a film resulting from the melting of a thin layer of powder, in which:
(a) the above silanized powder is used in electrified form, this powder having been charged by any means;
(b) the object is brought close to the powder or the object is brought into contact with the powder, the object being connected to zero potential or a potential sufficient to cover it with powder; and
(c) the object covered with the powder is then placed in an oven at a temperature high enough to obtain the coating film by melting the powder.

The present invention also relates to a method of covering an object with a film resulting from the melting of a thin layer of powder, in which:
(a) the above silanized powder is used in a fluidized bed,
(b) the object is heated to a temperature enough to cause the melting of the powder in contact with it,
(c) the object is immersed in the fluidized bed a time enough to be covered with the powder,
(d) the object is removed from the fluidized bed.

DESCRIPTION OF THE INVENTION

With regard to the polyamide, the term "polyamide" is understood to mean products derived from the condensation:
of one or more amino acids, such as aminocaproic, 7-aminoheptanoic, 11-aminoundecanoic and 12-aminododecanoic acids, or of one or more lactams, such as caprolactam oenantholactam and lauryllactam;
of one or more salts or mixtures of diamines, such as hexamethylenediamine, dodecamethylenediamine, metaxylylenediamine, bis-p-aminocyclohexylmethane and trimethylhexamethylenediamine with diacids, such as isophthalic, terephthalic, adipic, azelaic, suberic, sebacic and dodecanedicarboxylic acids;
or of mixtures of several of these monomers, resulting in copolyamides. Advantageously, nylon-11 and nylon-12 are used.

With regard to the silane, mention may be made by way of example of aminosilanes. Among aminosilanes, those having alkoxysilane functional groups are preferred. Thus, any product having an amine functional group and an alkoxysilane functional group may be mentioned. As an example, mention may be made of products of the following formula (1):

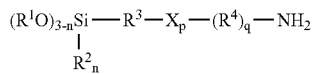

in which:
R1 denotes an alkyl group having from 1 to 8 carbon atoms or an alkyl group having from 2 to 8 carbon atoms and containing an oxygen atom within its chain;
n is 0 or 1;
R2 denotes H or an alkyl group having from 1 to 8 carbon atoms;
R3 denotes an alkyl having from 1 to 8 carbon atoms or an aryl or cycloalkyl group or an arylalkyl group;

X denotes

R5 denotes H or an alkyl group having from 1 to 8 carbon atoms;
p is 0 or 1,
R4 denotes an alkyl having from 1 to 8 carbon atoms; and
q is 0 or 1, with the condition that if q is 0 then p is 0.
Advantageously, the aminosilane is chosen from aminopropyltriethoxysilane and aminopropyltrimethoxysi lane.

With regard to the preparation of the silane-modified polyamide powder, this may be carried out by simple dry blending of the constituents. The polyamide powder has a particle size which may vary from 10 to 1000 μm. The expression "dry bending" is used as opposed to blending in which the polyamide is in the melt because in fact most silanes, and particularly aminosilanes, are liquids under normal conditions. Standard mixers for powder products may be used, for example a Henshel® mixer. The blending takes place at normal temperature and pressure. The blending time must be sufficient for the silane to become attached to the polyamide—this time may be between 2 and 15 minutes.

The silane concentration is advantageously between 0.05 and 2% in the case of 99.95 and 98% of polyamide, respectively. The silane concentration is preferably between 0.3 and 0.8% in the case of 99.7 and 99.2% of polyamide, respectively. It may be less, but in this case the beneficial effects of the invention diminish when the concentration decreases to 0.2 and 0.1%. If the silane concentration exceeds 0.4 or 0.5%, it is recommended to add a little water when blending the polyamide and the silane.

It is also possible to add the silane to the polyamide in the melt in a blending device and to reduce the product obtained into powder form. The blending time must be sufficient for the silane to become attached to the polyamide—this time may be between 2 and 15 minutes. For example, an extruder is used. The product recovered in granule form at the exit of the extruder is then ground to the same particle size mentioned in the case of the polyamide powder used in the dry-blending process.

The powder of the invention may also include UV stabilizers, antioxidants, dyes, pigments, fire retardants, bactericides, etc. These products are preferably incorporated into the polyamide before the silane is added.

With regard to the metals that it is wished to coat, mention may be made, as examples, of aluminium, aluminium alloys, steel and its alloys. Optionally, a surface pretreatment is carried out on the object before covering it with powder. These are the conventional pretreatments used in the coating industry, namely phosphatizing, degreasing and shot peening.

Next, this powder is applied to the metal surface and then heated in order to make the powder form a film. This technique is known per se. For example, a PA-11 powder not containing a silane is applied with the aid of an electrostatic gun using the corona effect, with a negative voltage of −30 kV, to a smooth steel plate. After application, the powder is left for two minutes; an impact is then applied to the middle of the rear face of the plate with the aid of a mass attached to a pendulum. The intensity of the impact is thus controlled. The amount of powder which becomes detached from the plate during the impact is measured. Approximately 75% of the powder becomes detached. The same test is carried out with a powder of the same composition to which 0.3% of aminopropyltriethoxysilane has been added as a dry blend. In this case approximately 25% of the powder becomes detached.

The coatings obtained after having melted the polyamide at 220° C. for 7 minutes are exposed to a salt-fog atmosphere for 2000 hours. In the case of the product not containing the silane, the adhesion, measured on a scale going from 0 to 4 (according to NFT 58-112), rapidly decreases down to 1 after 230 hours of exposure. In the case of the polyamide of the same composition, but containing 0.3% of aminopropyltriethoxysilane, the adhesion remains constant and equal to 3.5 up to 2000 hours.

The aminopropyltriethoxysilane, added as additive by dry blending, therefore makes it possible to obtain both improved electrostatic properties, preventing the detachment of the powder, and adhesion of the coating film obtained after curing which is maintained during a long period of exposure to a particularly corrosive atmosphere.

With regard to the means for charging these powders, it is possible to use the corona effect, triboelectrification and induction. Charging by triboelectrification is known per se and already described in the prior art. The powder may be deposited on the object by the fluidized-bed technique or by an electrostatic gun.

The publication "Triboelectrification of polymer powders in a fluidized bed", *Power Engineering; Journal of the Academy of Science of the USSR*, Vol. 19, No. 6, pages 75–83 describes a triboelectric charging system assisted by electrodes connected to a high voltage.

The publication "Charge of powdered paint according to a triboelectric mechanism during its fluidization", *Journal Lakokras, Mater. IKH Primen*, (1979), (4), 30–2, describes triboelectric charging in a conventional fluidized bed on the walls of the tank.

In Patent WO 00/76677, the powder is tribocharged, that is to say charged by contact or by friction. The friction is provided by the fluidizing gas or air which entrains the powder particles and allows them to come into contact with the tribocharging systems which will be described below. The charging system described in the present application is autonomous and requires no energy supply other than the gas for fluidizing the powder.

Advantageously, a "honeycomb" is used as tribocharging device. This is a structure composed of geometrical elements whose cross section may range from any type of polygon (the elements are then prisms) to a circle (the elements are then tubes). These elements are hollow, placed vertically and preferably have a thickness of between 1 and 10 mm; their length is, for example, between 15 and 25 cm. These tubes are fastened to one another so as to constitute a solid homogeneous assembly. The interstices between tubes are closed off by any means such as aluminium foils. Although any type of polygonal cross section can be envisaged, a cylindrical structure is preferred. A cylindrical geometry is preferred so as to allow homogeneous fluidization. End defects will be limited by a suitable length of the constituent tubes of the honeycomb, that is to say these tubes are advantageously greater than 15 cm in length.

This "honeycomb" is placed at the bottom of the bed. Enough room must be left above the bed in order to immerse the object and there must be around said object a sufficient volume charge density to ensure electrodeposition.

The "honeycomb" is placed in the lowest possible position in the bed, so as to optimize contact in the tubes without, however, disturbing the fluidization.

The diameter of the tubes is chosen to be as small as possible so as to increase the contact area, but it is necessary nevertheless to ensure that the tubes do not become blocked and are therefore wide enough to ensure correct fluidization. The longer these tubes, the better the electrical charge generated on the powder particles; however, this is limited by the space to be left for dipping the article. By way of example, it is possible to use tubes 25 mm in diameter and 150 mm in length. Advantageously, they are made of PVC or PTFE.

It is also possible to use a forced-circulation tribocharging tube. The term "forced circulation" is employed as opposed to circulation in the tubes of the honeycomb, which only takes place by the flow of the gas for fluidizing the bed. The term "forced circulation" is understood to mean that part of the contents of the fluidized bed, that is to say a mixture of fluidizing gas and powder, is removed and, with the aid of a pump or an equivalent device such as a gas ejector (preferably operating with the same gas as the fluidized bed) passes into one or more tribocharging tubes. Preferably, the pump and the tribocharging tube are outside the bed in order not to disturb its operation, and the gas and tribocharged powder are returned to the fluidized bed, after having passed through the tribocharging tube.

It is also possible to use a tribocharging gun or a corona-effect gun to deposit the powder on the object.

The principle of tribocharging powders using a gun, in which the powder to be charged is made to circulate under the effect of a gas stream, is known from Patent U.S. Pat. No. 4,399,945. The particles become charged by friction against a surface; an earthing system allows the charges to be removed.

Patent U.S. Pat. No. 5,622,313 describes an improvement to the previous one, that is to say, in order to remove the charges from the tribocharging surface, it is treated by a corona effect. The charges provided by the corona effect not only neutralize the charges which build up on the tribocharging surface but also pass into the powder and therefore add to the charges created by the triboelectric effect.

It has also been discovered that the powders of the invention have a greater facility for being tribocharged compared with powders containing no silane. Using the same tribocharging conditions, it is found that the powders of the invention carry an electrical charge 5 to 8 times greater than the same powders not containing silanes.

Once the object has been covered, it is put into an oven in which curing takes place. Depending on the geometry of the object, the properties of the powder and the desired rate of production, it is possible to use a convection oven, an infrared oven or an induction oven. This step of the method is known per se and has already been described in the prior art.

The immersion method can be used also. This method is known per se and has already been described in the prior art.

EXAMPLES

The following products were used:
RILSAN ES ab: denotes a PA-11 powder of 35 µm particle size and containing 40 wt % calcium carbonate;
AMEO: denotes aminopropyltriethoxysilane.

Example 1

Measurement of the Electrostatic Properties

A RILSAN ES ab was applied to a smooth steel plate using a corona-effect electrostatic gun.

A RILSAN ES ab, to which 0.3% of AMEO was added by a dry-blending method, was applied to another smooth steel plate using the same method.

The weight of the plate was measured before and after application of the powder. Several minutes later, the plate was subjected to an impact for the purpose of trying to detach the powder adhering to the steel by electrostatic effect. Again the weight of the plate was measured. In this way, the weight of powder which was detached from the steel by the effect of the impact was determined.

| Product | % of powder detached after 2 minutes | % of powder detached after 3 minutes |
|---|---|---|
| RILSAN ES ab | 75 | 95 |
| RILSAN ES ab + 0.3% AMEO | 25 | 25 |

Example 2

Measurement of the Adhesion After Exposure to Salt Fog

The two powders of Example 1 were applied to steel plates degreased with trichloroethylene and shot-peened; they did not contain an adhesion primer.

The plates were placed in an oven at 220° C. for 7 minutes. They were then removed from the oven and air-cooled. The appearance of the coatings obtained was identical for the two products. The initial adhesion was measured according the NFT 58-112 standard. A rating of 0 to 4 characterizes the adhesion.

The coated plates were placed in an apparatus allowing the coatings to be exposed to a salt fog (SF) atmosphere. The coated plates were then removed from the apparatus and the adhesion measured. The following results were obtained.

| Product | Adhesion after 1000 h of SF | Adhesion after 2000 h of SF |
|---|---|---|
| RILSAN ES ab | 0.5 | 0.5 |
| RILSAN ES ab + 0.3% AMEO | 3.5 | 3.5 |

Example 3

Measurement of the Adhesion After Exposure to Salt Fog as a Function of the AMEO Concentration Two other polyamide powders based on RILSAN ES ab were prepared, adding 0.1% AMEO to one and 0.2% AMEO to the other, using the dry-blending method. The coatings obtained, after electrostatic application of the powder and melting at 220° C. for 7 minutes, were exposed to salt fog. The following results were observed.

| Product | Adhesion after 1000 h of SF |
|---|---|
| RILSAN ES ab + 0.1% AMEO | 1 |
| RILSAN ES ab + 0.2% AMEO | 2 |

The invention claimed is:

1. A coated metal substrate comprising a metal substrate having directly deposited thereon a powder coating composition comprising 99.95 to 95% by weight of at least one polyamide and 0.05 to 5% by weight of at least one silane, said weight percentages based on the total weight of said polyamide and silane.

2. The coated metal substrate according to claim 1, wherein said powder coating composition comprises 0.05 and 2% by weight silane and 99.95 to 98% by weight of polyamide.

3. The coated metal substrate according to claim 1, wherein the powder composition has a particle size of between 10 and 1000 μn.

4. The coated metal substrate according to claim 1, wherein the polyamide is PA-11 or PA-12.

5. The coated metal substrate according to claim 1, wherein the silane comprises an aminosilane.

6. The coated metal substrata according to claim 5, wherein the aminosilane contains alkoxysilane functional groups.

7. The coated metal substrate according to claim 5, wherein the aminosilane has the following formula:

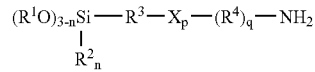

in which:

R1 denotes an alkyl group having from 1 to 8 carbon atoms or an alkyl group having from 2 to 8 carbon atoms and containing an oxygen atom within its chain, n is 0 or 1;

R2 denotes H or an alkyl group having from 1 to 8 carbon atoms;

R3 denotes an alkyl having from 1 to 8 carbon atoms or an aryl or cycloalkyl group or an arylalkyl group;

X denotes

R5 denotes N or an alkyl group having from 1 to 8 carbon atoms;

p is 0 or 1,

R4 denotes an Alice having from 1 to 8 carbon atoms; and q is 0 with the condition that if q is 0 then p is 0.

8. The coated metal substrate according to claim 1, wherein said powder coating composition comprises between 0.3 and 0.8% by weight silane and 99.7 and 99.2% by weight of polyamide.

9. Method of covering an object with a film resulting from the melting of a thin layer of powder, comprising the steps of:
(a) charging a powder comprising 99.95 to 95% by weight of at least one polyamide and 0.05 to 5% by weight of at least one silane in an electrified form, this powder having been charged by any means, said weight percentages based on the total weight of said polyamide and silane,
(b) bringing the object close to the powder or into contact with the powder, the object being connected to zero potential or a potential sufficient to cover it with powder; and
(c) placing the object covered with the powder in an oven at a temperature high enough to obtain the coating film by melting the powder, wherein said object is a metal object.

10. Method of covering an object with a film resulting from the melting of a tin layer of powder, comprising the steps of:
(a) placing a powder comprising 99.95 to 95% by weight of at least one polyamide and 0.15 to 5% by weight of at least one silane in a fluidized bed, said weight percentages based on the total weight of said polyamide and silane,
(b) heating the object to a temperature enough to cause the melting of the powder in contact with it,
(c) immersing the object in the fluidized bed for a time long enough forte object to be covered with the powder, and
(d) removing the object from the fluidized bed, wherein said object is a metal object.

* * * * *